May 30, 1939.   W. E. H. RHEIN   2,160,000
COMBINED INTAKE AND EXHAUST VALVE FOR INTERNAL COMBUSTION ENGINES
Filed June 7, 1938
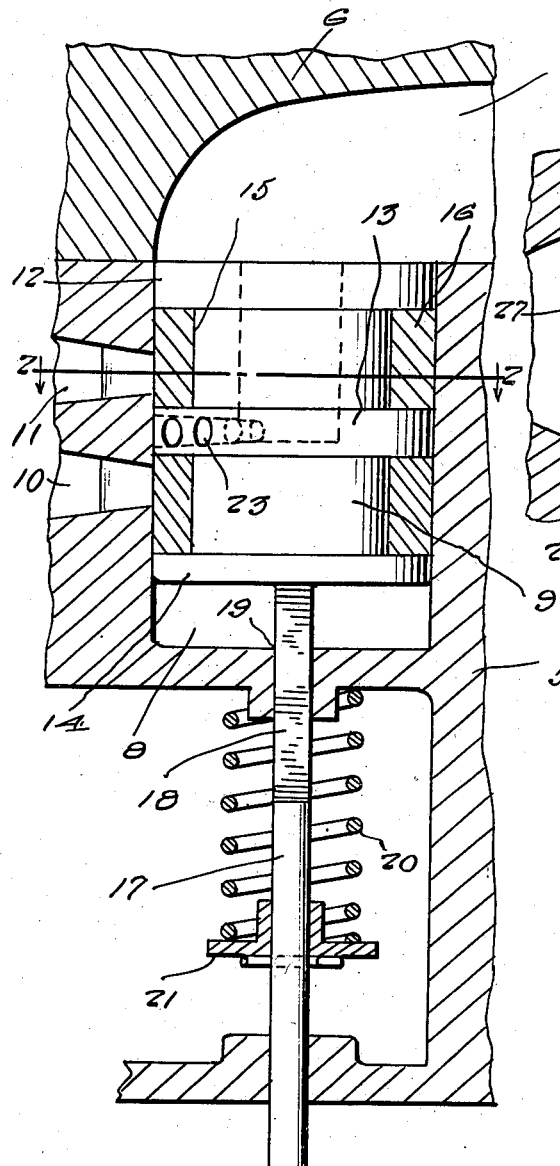
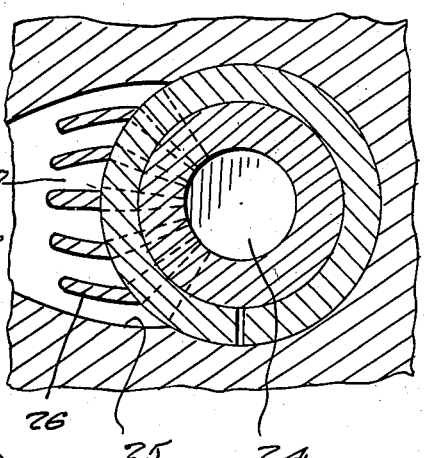
Inventor
W. E. H. Rhein
By Clarence A O'Brien
and Hyman Berman
Attorneys Patented May 30, 1939

2,160,000

UNITED STATES PATENT OFFICE 2,160,000

COMBINED INTAKE AND EXHAUST VALVE FOR INTERNAL COMBUSTION ENGINES

William E. H. Rhein, Reading, Pa.

Application June 7, 1938, Serial No. 212,376

3 Claims. (Cl. 123—188)

The present invention relates to valves for internal combustion engines and has for its primary object to provide a double duty valve embodying a valve structure adapted to control the intake of fuel into the engine cylinder and to provide for the exhaust of the products of combustion therefrom.

A further object is to provide a valve of this character of simple and practical construction, which is efficient and reliable in performance, relatively inexpensive to manufacture and maintain in operation and otherwise well adapted to the purposes for which the same is intended.

Other objects and advantages reside in the details of construction and operation as more fully hereinafter described and claimed, reference being had to the accompanying drawing forming part hereof, wherein like numerals refer to like parts throughout, and in which Figure 1 is a fragmentary sectional view of an internal combustion engine showing the valve in operative position therein.

Figure 2 is a sectional view taken substantially on a line 2—2 of Figure 1, and

Figure 3 is a side elevational view of one of the sealing rings carried by the valve.

Referring now to the drawing in detail, the numeral 5 designates part of an engine block having the head 6 within which the combustion chamber 7 is formed and with which a cylinder 8 communicates, said cylinder being formed in the block 5 and having a piston-type valve 9 operatively mounted therein.

An intake port 10 and exhaust port 11 communicate with the cylinder 8 through the walls of the block 5. The piston 9 is formed with a plurality of spaced annular flanges including an upper flange 12, an intermediate flange 13 and a bottom flange 14, the spaces between said flanges defining grooves 15 within which are fitted expansible sealing rings 16.

From the bottom of the piston extends a valve stem 17 having its upper portion square-shaped in cross section as shown at 18 and slidably fitted in a complementary shaped opening 19 in the engine block to prevent rotary movement of the stem and the piston 9. The usual valve spring 20 surrounds the valve having one end bearing against the engine block and its opposite end abutting a retainer or collar 21 carried by the stem to yieldably urge the piston or valve 9 downwardly. The lower end of the stem is operatively engaged with the cam 22.

The intermediate flange 13 of the piston is formed at one side with a plurality of radially extending openings 23 tapering inwardly and communicating with a central recess 24 in the upper portion of the piston, the recess 24 opening through the top of the piston for communication with the combustion chamber 7. The side walls of the intake and exhaust ports 10 and 11 are curved as shown at 25 and a plurality of curved fins 26 extend vertically in spaced relation in each of said ports to define passages 27 leading to the respective openings 23 in the piston.

In the operation of the device it will be apparent that as the piston or valve 9 is moved, the openings 23 will successively register with the intake and exhaust ports 10 and 11, whereby to admit fuel into the combustion chamber 7 and subsequently permit discharge of the products of combustion therefrom, the cam 22 being constructed and arranged to provide the proper timing of the movement of the valve for the purpose designed.

It is believed the details of construction and manner of operation of the device will be readily understood from the foregoing without further detailed explanation.

Having thus described the invention, what I claim is—

1. A valve construction for internal combustion engines comprising a cylindrical chamber in the engine block communicating with the combustion chamber, relatively closely vertically spaced intake and discharge ports communicating with said chamber, said ports having a common dividing wall, a piston valve operable in said chamber having its upper portion hollow and opening through the top of the piston valve, said piston valve embodying a plurality of spaced annular flanges including upper and lower and an intermediate flange and radially extending passages communicating with the hollow upper portion of the piston valve and extending through the outer walls of said intermediate flange and adapted for successive communication with the intake and exhaust ports upon the operation of the piston valve, and vertically extending fins projecting longitudinally in said intake and discharge ports defining passages communicating with the respective openings in said piston valve.

2. A valve construction for internal combustion engines comprising a cylindrical chamber in the engine block communicating with the combustion chamber, relatively closely vertically spaced intake and discharge ports communicating with said chamber, said ports having a common dividing wall, a piston valve operable in said chamber having its upper portion hollow and opening through the top of the piston valve, said piston valve embodying a plurality of spaced annular flanges, sealing rings positioned between said flanges and radially extending passages communicating with the hollow upper portion of the piston valve and extending through the outer walls of one of the flanges and adapted for successive communication with the intake and exhaust ports upon the operation of the piston valve, an operating stem for said piston valve of polygonal shape in cross section and a complementary shaped guide for said stem to prevent rotation of the piston valve.

3. A valve construction for internal combustion engines comprising in combination an engine block having a cylindrical chamber therein communicating with the combustion chamber of the engine, a piston valve operable in the chamber and embodying a plurality of spaced annular flanges including upper and lower flanges and an intermediate flange defining annular grooves between said flanges, sealing rings positioned in said grooves, a recess in the upper portion of the piston valve opening through the top thereof for communication with the combustion chamber, relatively closely vertically spaced intake and exhaust ports communicating with the cylindrical chamber and having a common dividing wall and radially extending passages in said intermediate flange and providing communication between said recess and said intake and exhaust ports during successive operative positions of the piston valve.

WILLIAM E. H. RHEIN.